(No Model.) 3 Sheets—Sheet 1.

D. N. B. COFFIN.
ODOMETER.

No. 323,498. Patented Aug. 4, 1885.

WITNESSES.
H. A. Dudley
L. P. Coffin

INVENTOR.
David N. B. Coffin

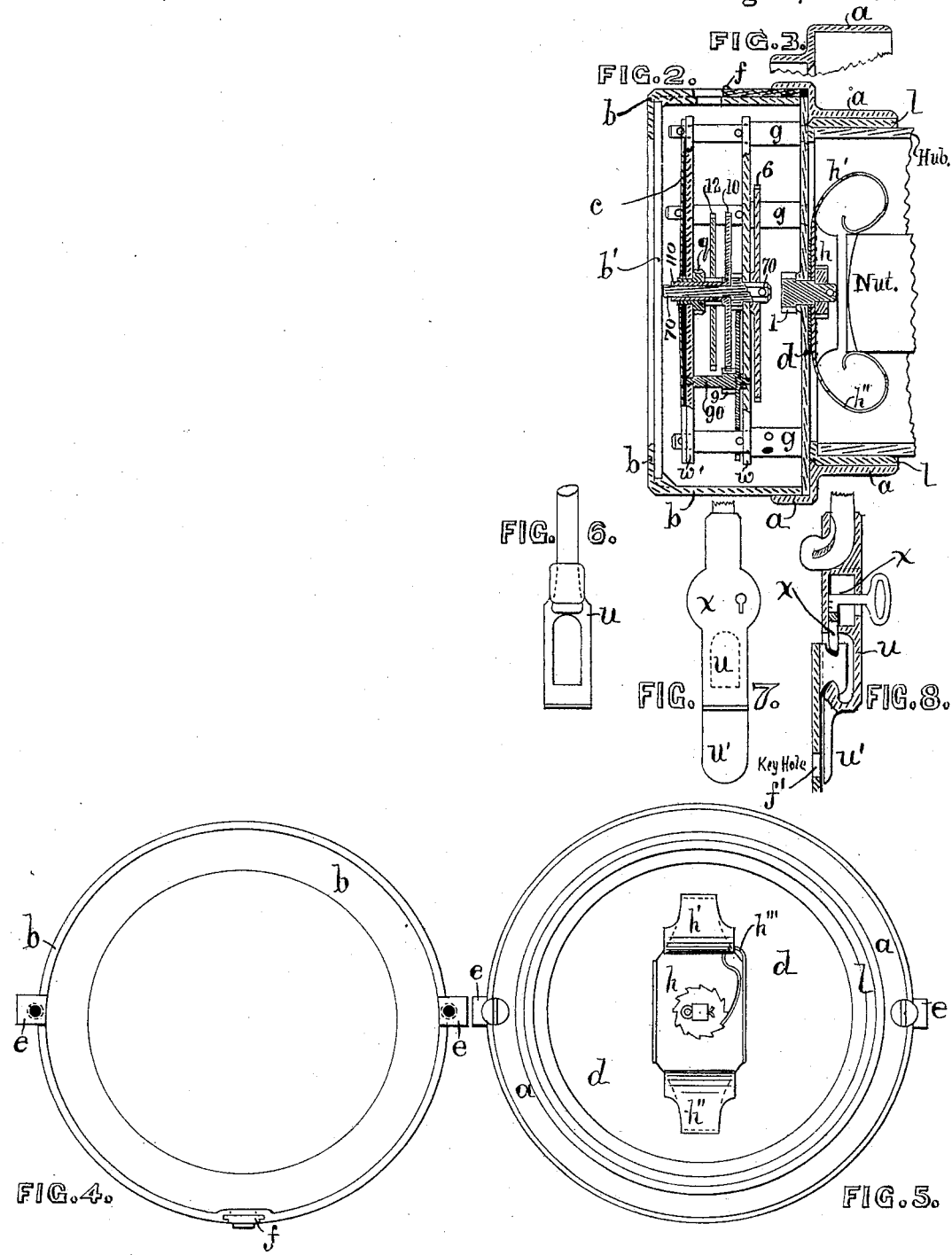

(No Model.) 3 Sheets—Sheet 3.
D. N. B. COFFIN.
ODOMETER.
No. 323,498. Patented Aug. 4, 1885.
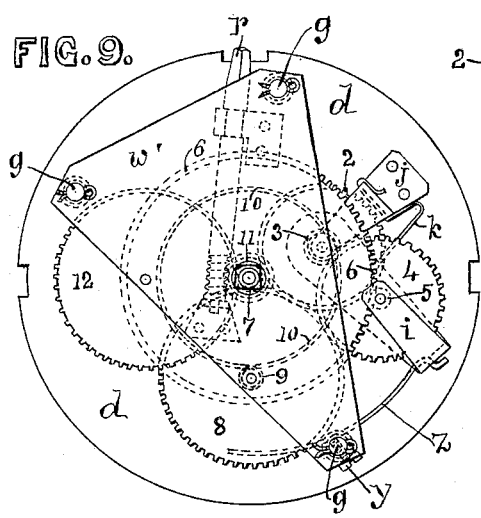
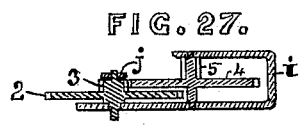
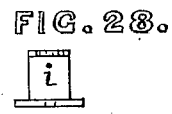
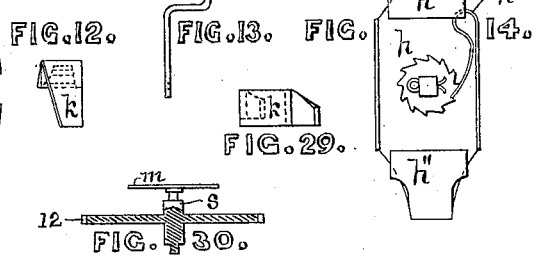
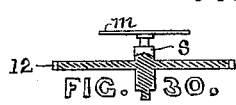
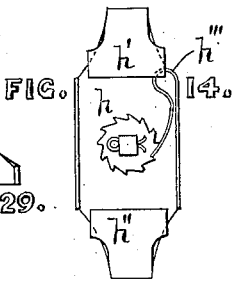
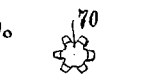
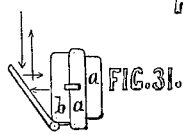
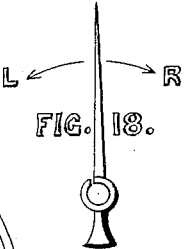
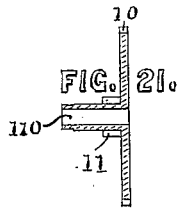
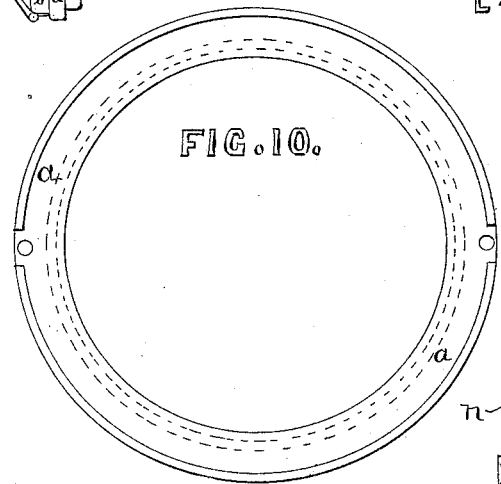
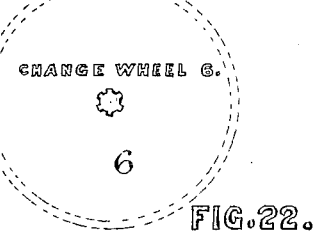
WITNESSES.
Frank F. Hodges
John H. Stevens
INVENTOR.
David N. B. Coffin

UNITED STATES PATENT OFFICE.

DAVID N. B. COFFIN, OF NEWTON CENTRE, MASSACHUSETTS.

ODOMETER.

SPECIFICATION forming part of Letters Patent No. 323,498, dated August 4, 1885.

Application filed November 17, 1884. (No model.)

*To all whom it may concern:*

Be it known that I, DAVID N. B. COFFIN, a citizen of the United States, residing in the city of Newton, (post office, Newton Centre,) in the county of Middlesex and State of Massachusetts, have invented certain new and useful Improvements in Odometers or Way-Measuring Machines, of which the following is a specification, which, with the accompanying drawings and reference-letters, forming a part of thereof, fully describes my invention.

My invention relates to various features in the construction of the parts, and to the arrangement and combination of them in a complete machine, as more fully and particularly set forth and claimed below.

Figure 1:
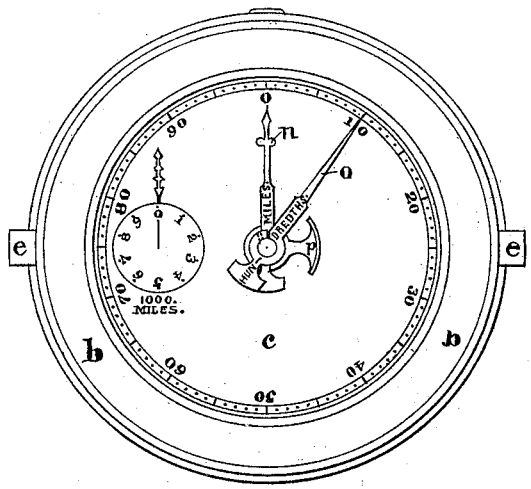
Figure 2:
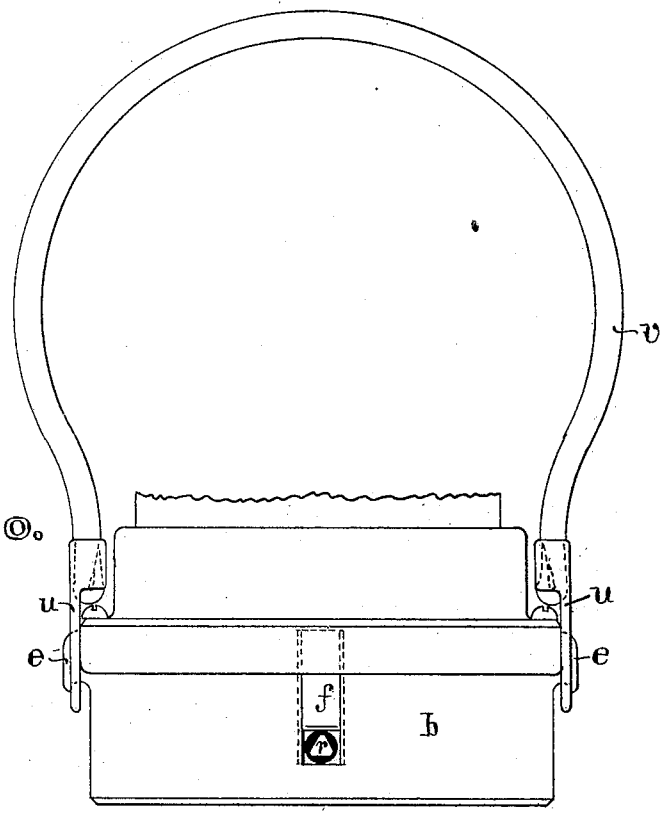

Of the drawings, Figure 0 is a side view or plan. Fig. 1 represents a face view or elevation. Fig. 2 is a sectional elevation of the machine. Fig. 3 is a similar view of a modification of ring $a$. Fig. 4 is the reverse view of ring $b$ to that shown in face view, Fig. 1. Fig. 5 is similarly a reverse view of the machine, the fastening-strap being omitted, as in the face view. Fig. 6 is another view of fastener $u$ shown in Fig. 1, in connection with strap $v$ and lug $e$, in one of its simplest forms. Figs. 7 and 8 are illustrations of the same, showing how any suitable lock and key may be used in connection therewith. Fig. 9 shows a view, corresponding to the face view, of the inner works and frame, the case, face, and pointers, and part $p$ of the setter being removed. Fig. 10 is a view of ring $a$ in the direction corresponding to that of the face view. Fig. 11 shows the screw or worm and its bearings used to operate, through worm-wheel $q$, the setter-arm $p$. Fig. 12 shows spring $k$. Fig. 13 is a side view of stand $j$. Fig. 14 is a view of my improved nut-clasp, corresponding to Fig. 5. Fig. 15 is a view of worm-wheel $q$, sleeve-shaft, and setter-arm $p$. Fig. 16 is a view of setter-arm $p$, corresponding to Fig. 1. Fig. 17 is an inverted elevation of the same. Fig. 18 is an elemental view of a pointer for the purpose of illustrating its principle of action. Fig. 19 is a longitudinal sectional view of the shaft 70, which carries change-wheel 6 and gear 7 and the hundredth-pointer. Fig. 20 is an end view of the same. Fig. 21 is a sectional view of sleeve-shaft 110, carrying gears 10 and 11 and the mile-pointer. Fig. 22 indicates by dotted lines the teeth of change-wheel 6, and at the center shows one of the methods found convenient to be used in securing it to shaft 70. Figs. 23, 24, 25, and 26 illustrate the construction of the pointers with reference to their being made to cling to their shaft by one direction of movement and relax their adherence by means of the opposite movement, relatively. Fig. 27 is a sectional view of gears 2 3 4 5, their shafts, stand $j$, and swing $i$. Fig. 28 is an elevation or end view of swing $i$. Fig. 29 is another view of pawl or spring-pawl $k$. Fig. 30 is a sectional elevation showing the thousand-mile graduated face $m$, its shaft, and gear 12, by which it is caused to revolve. Figs. 31 and 32 illustrate in elevation a combined cover and mirror, open and closed, respectively.

Like letters refer to the same or corresponding parts in all the figures.

The careful reading of the description of the figures already given will doubtless give a pretty clear idea of the machine; but to be more particular, a base-plate, $d$, has permanently fixed to it three or more studs, $g$. These studs $g$ carry or support the two plates $w$ and $w'$, which, together with plate $d$, support and form bearings for all the operative mechanism. The two plates $w$ and $w'$ may, if preferred, be made fast to each other, so forming an independent frame-work which may then be supported as one body upon the studs $g$. This may be a convenience in the matter of changing-wheel 6, as described further on. This plate $d$ is then fitted closely into the ring $a$, which may properly be called the "basal ring." The ring $b$, which may be called the "front ring," is then fitted closely within the rim of ring $a$, (see Fig. 2,) and nicely to bear upon plate $d$, so that when the screws shown in Figs. 1 and 5 or other suitable fastenings are made to press the rings $a$ and $b$ toward each other the plate $d$ becomes firmly held between them and secured from movement in any direction. The ring $a$ has one side opposite to that in which plate $d$ is fitted made of a diameter adapted to the dimensions of the wheel-hub, to which the odometer is to be applied. This diameter is made larger than the hub, so as to receive an elastic or partly-elastic cushion ring, $l$, of leather, paper, rubber, or other material. The plate $d$, being notched to receive lugs, is prevented from rotary movement. The part of the ring inclosing the hub can, as illustrated, be made of greater or less diameter than that part which incloses the plate $d$ and ring $b$.

The case as composed of basal ring $a$, front ring $b$, and any suitable front plate of glass, or otherwise, $b'$, is secured to the wheel-hub by slipping it with its cushion-ring $l$ on the hub until the end of the hub presses the cushion to plate $d$ or a flange in ring $a$. Then it may be secured in any suitable way, but preferably as shown. Lugs $e$ are provided on ring $b$, to which may be looped a suitable socket or loop, $u$, attached to a suitable thong, strap, or cord, of leather, wire, rubber, or other suitable material—preferably rubber, leather, or other material which has a slight amount of elasticity, and is of such character or is so covered as to avoid chafing the parts to which it is applied. This thong is passed partly around the hub and between spokes on opposite sides of the hub to its connections, as shown, to the lugs on the case. For all ordinary use the elasticity of the thong will keep sockets $e$ safely hooked onto hook-shaped lugs, as shown.

For purposes of locking up to prevent unauthorized persons from unfastening, any suitable lock can be applied or constructed in connection with sockets $u$ and the lugs $e$, as shown, in which case I extend the socket-piece as shown in Figs. 7 and 8, and locate the hand-setting key-hole, hereinafter referred to, under it, so thereby to secure that also from unauthorized use.

This fastening and locking device is shown in part in my other application, filed January 2, 1884, now before the office, and is therein disclaimed.

The plate $d$ carries in a suitable bearing at its center the journal of gear 1. On the same journal, or a continuation thereof, is arranged to turn freely the part marked $h$, $h'$, and $h''$. This I will call a nut-clasp, after one of its chief functions. It has flanges or guards to prevent the shaft of gear 1 and other parts from being crowded by the nut. It carries a pawl or pawl-spring to engage the ratchet-wheel that gives impulse to the shaft or journal of gear 1, and it clasps the axle-nut with its curved and easily-yielding springs $h'$ and $h''$. These curved and easily-yielding springs have preferably widened ends, by which they take a broad bearing upon the sides of the nut. They are two or more in number, as shown. They, with the spring-pawl flanges and part forming the bearing on the journal, may all be formed in one piece from a sheet of metal, as shown. This is the simpler construction, though it (the nut clasp) may be in parts, if preferred, and a separate pawl and spring be attached to the central part by common methods. The gear 2 plays into gear 1, and is on a shaft or journals common to gears 2 and 3. A swing stand or carrier is pivoted or journaled concentrically to gears 2 and 3, and carries gears 4 and 5, having common journals. A central shaft in line with gear 1 and its shaft, but distinct and detached entirely from it, is carried by plates $w$ and $w'$, and has fitted removably to its inner end the wheel 6. This wheel 6 is provided with a great number of teeth. Being upon a center shaft, it can be comparatively very large, there being nothing within studs $g$ to interfere with its being thus large, and wheels 2, 3, 4, and 5 can be so proportioned as to permit the same, so that when wheel 6 is provided in graded sizes, varying but one tooth between one size and the next, it serves as an excellent and sufficient means to adapt the registering to differing sizes in road or carriage wheels. The wheel 6 gives movement to its shaft 70, the gear 7 thereon, and a pointer on its other end, which indicates one-hundredths on the face $c$, which is graduated to hundredths, as shown. The wheel 7 gives motion to an intermeshing gear-wheel, 8, upon a common shaft or journals with gear-wheel 9, and gear 9, driven thus by gear 8, gives rotary motion to gear 10 and its sleeve-shaft 110, and in the same direction of rotation as that of shaft 70. On this sleeve-shaft, inclosing shaft 70, is mounted a pointer moving slower in the proportion of one to one hundred than shaft 70 and its pointer, so that upon the same graduated dial upon which that pointer on shaft 70 indicates hundredths this pointer on shaft 110 indicates units or miles. Upon shaft 110 is gear-wheel 11 meshing into gear-wheel 12, which, with the graduated face $m$, is mounted on a common shaft or journals, S, and thus the face $m$ is caused to rotate in an opening or depression for the purpose in the larger face $c$ slower than shaft 110, and its pointer in the proportion of one to ten, whereby, being numbered as shown, and rotating in a direction opposite to the motion of the pointers, it is caused to register the number of hundreds of miles marked by the unit or mile pointer, and by means of a stationary index or pointer, as shown in Fig. 1. This I call the "thousand-mile face," and I allow it continuity of operation, while I provide for setting the moving pointers for units and hundredths back to the zero-point at pleasure.

The means for thus setting the pointers back at the zero-point I will describe. It is not, however, by a backward movement. For this purpose the pointers are moved forward singly or together by means of the setter-arm $p$. This arm is mounted on a sleeve-shaft of worm-gear $q$, as see Fig. 15. It has a part of wedge-shape attached to an elastic or spring part, which is joined to the socket embracing the sleeve-shaft or neck of gear $q$, and is made to receive a circular movement concentric to the axis of the pointers. When moved forward—i. e., in the direction of the movement of the pointers—its broad end pushes the pointers before it. When moved backward or in the opposite direction, its wedge-shaped end directs it beneath the pointers, while its spring or elastic character permits it freely thus to be depressed; and this action also occurs whenever the pointers pass in the forward direction, whereby they pass freely over and by it.

Different methods may be used to so connect the pointers to the moving mechanism that they may be susceptible of this movement for setting. That which now seems preferable I will describe, viz: I make the hub or that part of the pointer which is to connect it to its spindle or driving-shaft on the principle of a coil around the shaft in the direction opposite to that in which the setting is done, or that the pointer is to be pushed in setting, or that the driving-shaft turns. By reference to Fig. 18, the shaft turns in the direction toward R or the right. Now, if the pointer is pushed in that direction, it will be observed as the force begins to approach the coil around the shaft the tendency is to open or straighten that part of the coil to which the pointer is joined, and as the force increases by meeting the resistance this action gradually advances around the shaft in the direction the force is exerted until the coil relaxes somewhat, when it slips or slides around the surface of the shaft without abrading or badly wearing the surfaces in contact. Thus when the shaft and pointer are rotating in ordinary course, any resistance to the pointer—as, for instance, when passing the setter-arm, a very slight resistance occurs— the opposite action occurs, causing the coiled end of the pointer or hub to hug more closely the shaft, and so not fail to be properly driven. When a counter-weight to the pointer is needed it can be attached to the coil, as shown. The sleeve-shaft and setter-arm are moved by means of the attached worm-gear $q$, operated by the screw or worm $r$, the bearings of which are fastened to or formed on the plate $w'$. This worm is made to actuate the wheel, its shaft, and the setter-arm in either direction at pleasure, by means of any suitable key or wrench, which may be applied to its end and be removable, or have its setting in the case where it passes through, where it will close the opening and be always ready for use.

When removable, I provide the slide $f$, as shown (now open) in Figs. 1 and 4. The ring $a$ covers its rear end, and the groove left at its rear end, when it closes the key-hole, and the plate $d$ may be notched, as see Fig. 9, to give it plenty of room to slip under ring $a$ in opening the key-hole.

Referring back again to the construction of the pointers, additional elasticity may sometimes be gained by forming a loop, as shown in Figs. 24 and 25, opposite the joint or parting, if desired.

A tubular part, conforming to the coil principle, as described, may be used, as in Fig. 26, while in practice I have found it could be successfully dispensed with, as in Fig. 23.

In both cases of pawls used—viz., $h'''$ and $k$ —I have shown a simple stamped sheet-metal spring as serving the double purpose of an ordinary pawl and spring to actuate it, and in practice I have found the same to work satisfactorily, while they are very cheaply made. The pawl and spring, however, are substituted when preferred. The shafts 70 and 110 are made with a slight taper to retain the pointers. Pins may be used when preferred.

The features which render this odometer so easily adaptable to the great variety there is in the size of carriage-wheels, the size of hubs and axle-nuts are very important, and it is believed superior to any provision heretofore made in this class of instruments therefor— viz: The easily-yielding curved springs $h'$ and $h''$ will fit any size nut. The ring $a$ is of so extremely simple construction that it will be provided in graded sizes to fit all hubs, while each equally fits the uniform size of ring $b$. The case is so simply united and the plates $w'$ and $w$ are so easily removed that the change-wheel 6, which is also provided with any required number of teeth to adapt the instrument to any size road-wheel, can be changed in a moment. In this connection I will say the swing $i$ is swung outward, while the wheel 6 is taken off and one with a different number of teeth put on. Then it is swung back till gear 5 again meshes with the changed wheel 6. A convenient means for holding and releasing the swing is shown in Fig. 9. It consists of a segmental rod attached and adjusted by means of a set-screw to one of the studs $g$ or other fixture. Other fastenings, however, can be used.

It will be observed the machine is made up of simple, easily handled and manipulated divisions—first, the two rings $a$ $b$, then the plate $d$ carrying the nut-clasp, gear 1 and intermediate parts, swing $i$, stand $j$, gears 2, 3, 4, 5, and connecting parts; then the frame, consisting of plates $w'$ and $w$, connected, as shown, only by the shafts and gears, or, as suggested, by separate studs or connections, and removable from studs $g$ for convenience of changing gear 6, and having the graduated face $c$ held by the same studs and pins as themselves to plate $w'$. This novel and useful division into parts, making the several parts so easily accessible, and, on being taken apart, so easily put together, is of much account and value. Again, the method of uniting the rings $a$ $b$ and clamping the plate $d$ between them, affords, besides its convenience and effectiveness, the advantage that its security is not alone dependent on the screw or substitute fastenings, but the action of the strap-fastenings and lugs $e$ holds the instrument together.

To give an illustration of the reading of the instrument, I will suppose the thousand-mile dial to have rotated till the figures 3 and 4 are one on either hand of the stationary pointer, the mile-pointer at 50, the hundredth-hand at 25. The reading would be 350.25 miles, (three hundred and fifty and twenty-five one-hundredths miles.)

I propose to make the odometer complete, as shown; also complete leaving out the thousand-mile gearing and face and index or pointer; also, complete in either of these cases with the setter mechanism; also, as in either without the setter mechanism.

The cost being proportionately less, graded prices can be established in this variety of use of my improvements.

I also provide, when desired, another grade of cost and increased convenience, with protection to the face and its glass cover, by means of the hinged metal mirror-lined cover, shown in Figs. 31 and 32. These views, though on reduced scales, serve sufficiently to illustrate the improvement. The cover is easily thrown open, as in Fig. 31, with a whip-stock or cane, by a person in the carriage. It is easily closed in the same way. These operations are made easy in several ways. A very satisfactory one which I have had in use is illustrated in Fig. 31. A simple spring acting upon small elevations and depressions upon the hub or rounded part of the hinge holds the cover in a closed position, and also in the proper angular position when open, so that rays of light from the sky overhead are thrown directly upon the faces and pointers, and returning rays are reflected to the eye in the carriage. One in the carriage is thus furnished with an easy view of the graduated faces and pointers, and, what is sometimes of more consequence, the best light—that from the zenith—is made available for reading the indications or register.

When one prefers to omit the setting back of the pointers to the zero-point, he has only to read the register at the beginning of a measurement, and the same at the end, and subtract the one from the other, to find the distance traveled. The materials for the manufacture need not be materially different, otherwise than specified, from what is commonly used in kindred manufactures. The gear 1 may also be actuated (or detained, perhaps, is more correct in some instances) in the various ways illustrated in my other application now before the office.

I claim the following improvements in odometers or distance-measuring instruments, viz:

1. An odometer as constructed with fixed and rotating graduated faces, fixed and rotating or revolving pointers, change-wheel 6, swing $i$, gear 1, nut-clasp, intermediate parts, frame-work, case, and mirror-cover, substantially as described.

2. An odometer as constructed with a rotating hundredth-pointer and a concentric rotating unit-hand or mile-pointer, a common hundred-point graduated-face, change-wheel 6 upon the shaft of the hundredth-pointer, with a suitable disengaging device, as swing $i$ and gears, with intermediate and actuating mechanism, substantially as described.

3. In the construction of an odometer, a unit or mile pointer carried upon a sleeve-shaft within which is a shaft carrying a hundredth-pointer, both actuated through intermediate gearing and changeable gears, with speeds proportionate to the diameter or circumference of a measuring or road wheel and indicating distances upon common graduation points or upon a common face, or both points and face, substantially as shown.

4. In an odometer, the case and frame as constructed and united—viz., having the ring $a$ fitted to the wheel-hub outside, and to base-plate $d$ and ring $b$, the two rings thus clamping plate $d$ and carrying it with attached parts—substantially as described.

5. As applied in an odometer, the setter-arm $p$, its sleeve-shaft, and attached worm-gear $q$ and worm $r$, with necessary related parts, substantially as and for the purpose set forth.

6. The odometer adjustable pointer as constructed with the described hub-part, detached or having an open joint on one side adjacent to the base of the pointer to allow a grasping and releasing action, substantially as described.

7. A pointer having the hub or part grasping the arbor divided at one side of its junction with the index-finger, for the purpose of causing it to release its grasp on the arbor when turned thereon in one direction, and of resuming its grasp when the opposite relative movement occurs.

8. The combination, in an odometer, of the rotating adjustable pointer and its shaft, and the setter-arm $p$ and its shaft and suitable operative mechanism, substantially as described.

9. In an odometer, a rotating pointer adjustable upon its arbor by means of a setter-arm, $p$, operated by a worm-gearing and sleeve-shaft, substantially as described.

10. In an odometer, in combination with the indicating-face, a cover provided with an inner reflecting-surface or mirror, and made adjustable so as to reflect the zenith light upon the indicating-face and enable the observer from his seat in the carriage to see the indications, substantially as shown and described.

11. The basal ring $a$ as constructed with a cavity lined with an elastic or semi-elastic material fitted to receive the carriage-hub and provided on the opposite side with a seat and rim, within which rim is fitted and fastened the base-plate of the internal mechanism, and the front case-ring, $b$, substantially as described.

12. The front ring, $b$, as constructed, with a glass front and provided with lugs $e$ and fastenings $u$ $v$ by which it is held within ring $a$ and, with the entire instrument, is made fast to the wheel-hub, substantially as described.

13. In an odometer, the base-plate $d$, constructed with a bearing for gear 1, and studs $g$, fitted to carry frame-work, as $w$ and $w'$, and fitted within ring $a$ and held by ring $b$ therein, substantially as described.

14. The combination of the lock-fastening $u$ $v$, the odometer-case, lug, key-hole, and guard $w'$, substantially as described.

15. The combination of the fastening $u$ $v$, lock, and odometer-case and lug $e$, substantially as described.

16. In an odometer, the nut-clasp as constructed with the two curved and easily-yielding springs $h'$ $h''$, substantially as shown.

17. In an odometer, the nut-clasp as constructed with the widened ends for grasping the nut by the long curved and easily-yielding springs $h'$ $h''$, substantially as shown.

18. In an odometer, the nut-clasp as constructed, having a bearing for the neck of gear 1, the spring-pawl $h'''$, the springs $h'$ $h''$, and side guards or flanges, all in one piece, substantially as shown.

19. In an odometer, the swing $i$ as constructed to carry the double stud-gear 4 5, and connecting the gear 3 with the change-gear 6, substantially as described.

20. The shaft 70, arranged in the same line with gear 1, but detached, carrying a pointer, and a change-wheel, 6, giving required changes in speed proportioned to the size of the road or measuring wheel, the same being provided with intermediate gearing, and made capable of being connected and disconnected at will for changes, substantially as described.

21. In an odometer, a change-wheel, 6, on a central pointer-shaft, in combination with a central driving-shaft and intermediate detachable and connecting gearing, substantially as described.

22. An odometer as constructed—viz., having a central sleeve-shaft with mile-pointer, intermediate gearing, and central hundredth-pointer shaft, made variable together in their movements proportionate to different diameters of road or measuring wheels by means of change-gear 6, and suitable related and operative mechanism—substantially as described.

23. In an odometer having a fixed face and rotating pointers carried upon and rotated by a central shaft or shafts, a rotating face geared directly to and actuated by one central shaft for registering, in combination with a road or measuring wheel, substantially as described.

24. In an odometer, in combination with a measuring or road wheel and intermediate gearing, a central pointer-shaft and sleeve pointer-shaft, to which is directly geared a rotating face, substantially as shown.

25. In an odometer, the swing $i$ as constructed, having the long and short arms, and carrying the double stud-gears 4 5, and pivoted by its long arm to the journal or bearing of the double stud-gear 2 3 for engaging and disengaging the change-wheel, substantially as described.

26. In an odometer, an adjustable indicating revolving pointer, in combination with a yielding wedge-shaped or inclined setter-arm for adjusting the same, substantially as described.

27. In an odometer, the rotating pointer, adjustable upon its arbor with reference to the face graduations by means of and in combination with a yielding setter-arm, $p$, operated by an attached worm-gear and worm, substantially as described.

28. In an odometer, the combination of a hinged angularly-adjustable reflecting and protecting cover and indicating face, reflecting the zenith light upon the face, and face indications to the observer's eye in the carriage, substantially as described.

29. In an odometer, the two pairs of double stud-gears 2 3 and 4 5 and swing $i$, as constructed and arranged to connect the two axially-coincident shafts and their gears 1 and 6, substantially as described.

30. In an odometer, the combination of the cushioned socket to receive the end of the hub of the measuring-wheel and an elastic fastening, substantially as described.

D. N. B. COFFIN.

Witnesses:
JOHN H. STEVENS,
FRANK F. HODGES.